United States Patent [19]
Lamport

[11] Patent Number: 5,261,085
[45] Date of Patent: Nov. 9, 1993

[54] FAULT-TOLERANT SYSTEM AND METHOD FOR IMPLEMENTING A DISTRIBUTED STATE MACHINE

[75] Inventor: Leslie B. Lamport, Palo Alto, Calif.

[73] Assignee: Digital Equipment Corporation, Maynard, Mass.

[21] Appl. No.: 913,759

[22] Filed: Jul. 13, 1992

Related U.S. Application Data

[63] Continuation of Ser. No. 370,441, Jun. 23, 1989, abandoned.

[51] Int. Cl.$^5$ ............................................. G06F 11/18
[52] U.S. Cl. ................................ 395/575; 364/242.94; 364/269.1; 364/DIG. 1; 371/36
[58] Field of Search ............................... 371/16.1, 36; 364/229.2, 240.9, 242.94, 269.1; 395/575

[56]    References Cited
       U.S. PATENT DOCUMENTS

| | | | |
|---|---|---|---|
| 4,418,396 | 11/1983 | Hemdal et al. | 364/900 |
| 4,532,606 | 7/1985 | Phelps | 365/49 |
| 4,538,241 | 8/1985 | Levin et al. | 364/900 |
| 4,694,396 | 9/1987 | Weisshaar et al. | 364/300 |
| 4,703,481 | 10/1987 | Fremont | 371/12 |
| 4,789,986 | 12/1988 | Koizumi et al. | 371/36 |
| 4,799,140 | 1/1989 | Dietz et al. | 364/200 |
| 4,914,657 | 4/1990 | Walter et al. | 371/36 |

*Primary Examiner*—Charles E. Atkinson
*Attorney, Agent, or Firm*—Flehr, Hohbach, Test, Albritton & Herbert

[57] ABSTRACT

System and method for implementing a distributed state machine in which consistency is maintained despite the failure of any number of processes and communication paths. This machine and method are suitable for systems with modest reliability requirements that do not justify the expense of an extremely fault tolerant, real-time implementation. One process in a network of server processes is chosen as the leader, and that leader is responsible for broadcasting state machine commands to the other processes. The commands are numbered consecutively, and they are recorded in stable storage by the processes. Each command is broadcast through a uniquely numbered ballot or referendum, and each process participating in a ballot may either vote to accept the command or not vote. To be issued, a command must be voted for by a majority of the processes in the system. Each issued command is stored by each of the processes in the majority set which voted for it, and since any two majority sets must have at least one process in common, any command which has been issued will appear in the store of at least one process of any majority set participating in a subsequent ballot. When a new leader is chosen, messages are exchanged between the new leader and the other processes in the system to ensure that each of the processes has all of the commands that the other processes have. As part of this procedure, any command for which one of the processes has previously voted but does not have a command number is broadcast as a proposed command in a new ballot.

19 Claims, 10 Drawing Sheets

FAULT-TOLERANT SYSTEM AND METHOD FOR IMPLEMENTING A DISTRIBUTED STATE MACHINE

This is a continuation of application Ser. No. 07/370,441 filed Jun. 23, 1989, now abandoned.

This invention pertains generally to distributed computing systems and, more particularly, to a distributed system and method utilizing a state machine approach and having the ability to continue working despite the occurrence of a fault such as a processor stopping or running slowly, or the loss or duplication of messages between processors.

In a distributed system, two or more data processing systems or computers are connected together in a network in which the processors or computers can send messages to each other and processes can be distributed among the processors or computers. Heretofore, such systems have is generally been designed in an ad hoc fashion, with synchronization among the component processes being tailored to the desired functionality. Such systems generally cannot be modified without redesigning the underlying concurrent algorithms.

In the state machine approach to designing a distributed system, the component processes are synchronized by having every process independently simulate the execution of the same state machine. The state machine is tailored to the particular application, and it is implemented by a general algorithm for simulating an arbitrary state machine.

A state machine generally consists of a set of states, a set of commands, a set of responses, and a function that assigns a response/state pair (i.e., a response and a state) to each command/state pair (i.e, a command and a state). A state machine executes a command by producing a response and changing its state, with the command and the machine's current state determining its response and its new state.

In the state machine approach, a distributed system is implemented with a network of server processes. The servers transform client requests into state machine commands, execute the commands, and transform the state machine responses into replies to clients. A general algorithm ensures that all servers obtain the same sequence of commands, thereby ensuring that they all produce the same sequence of responses and state changes—assuming they all start from the same initial state. In such a system, a client request to perform a particular task is transformed into a state machine command. That command is executed, and the state machine response is transformed into a reply to the client, which is sent to him by the server which received his request. Since all servers perform the same sequence of state machine commands, they all maintain consistent versions of the state machine state. However, at any time, some servers may have earlier versions than others because a state machine command is not always executed at the same time by all servers.

In a distributed system utilizing the state machine approach, the functionality of the system is expressed by the state machine, which is a function from command state pairs to response state pairs. Problems of synchronization and fault tolerance are handled by a general algorithm with which servers obtain a sequence of commands. When a new system is designed, only the state machine is new. The servers obtain the state machine commands by a standard distributed algorithm that has already been proved to be correct. Functions are much easier to design, and to get right, than distributed algorithms.

Heretofore, algorithms for implementing arbitrary state machines have been devised which could tolerate up to any fixed number of arbitrary failures. These algorithms guarantee that, if fewer than the fixed number of processes fail, then state machine commands are executed within a fixed length of time. Such algorithms are suitable for applications requiring real-time response. However, if more than the fixed number of failures occur, then different servers may have inconsistent copies of the state machine. Moreover, the inability of two servers to communicate with each other is equivalent to the failure of one of them. For a system to have a low probability of losing consistency, it must use an algorithm which can tolerate a large number of process failures, and this implies a large cost in redundant hardware, communications bandwidth, and response time. The large cost generally makes this implementation suitable only for ultra-reliable process control systems.

The invention provides a system and method for implementing a distributed state machine in which consistency is maintained despite the failure of any number of processes and communication paths. This system and method are suitable for systems with modest reliability requirements that do not justify the expense of an extremely fault tolerant, real-time implementation.

In the system and method of the invention, the state machine commands are numbered consecutively. One process is chosen as the leader, and that leader is responsible for broadcasting the commands to the other processes. Each command is broadcast through a uniquely numbered ballot or referendum, and each process participating in a ballot may either vote to accept the command or not vote. To be issued, a command must be voted for by a majority of the processes in the system. Each issued command is stored by each of the processes in the majority set which voted for it, and since any two majority sets must have at least one process in common, any command which has been issued will appear in the store of at least one process of any majority set participating in a subsequent ballot. When a new leader is chosen, messages are exchanged between the new leader and the other processes in the system to ensure that each of the processes has all of the commands that the other processes have. As part of this procedure, any command for which one of the processes has previously voted but does not have a command number is broadcast as a proposed command in a new ballot.

Figure 3A:
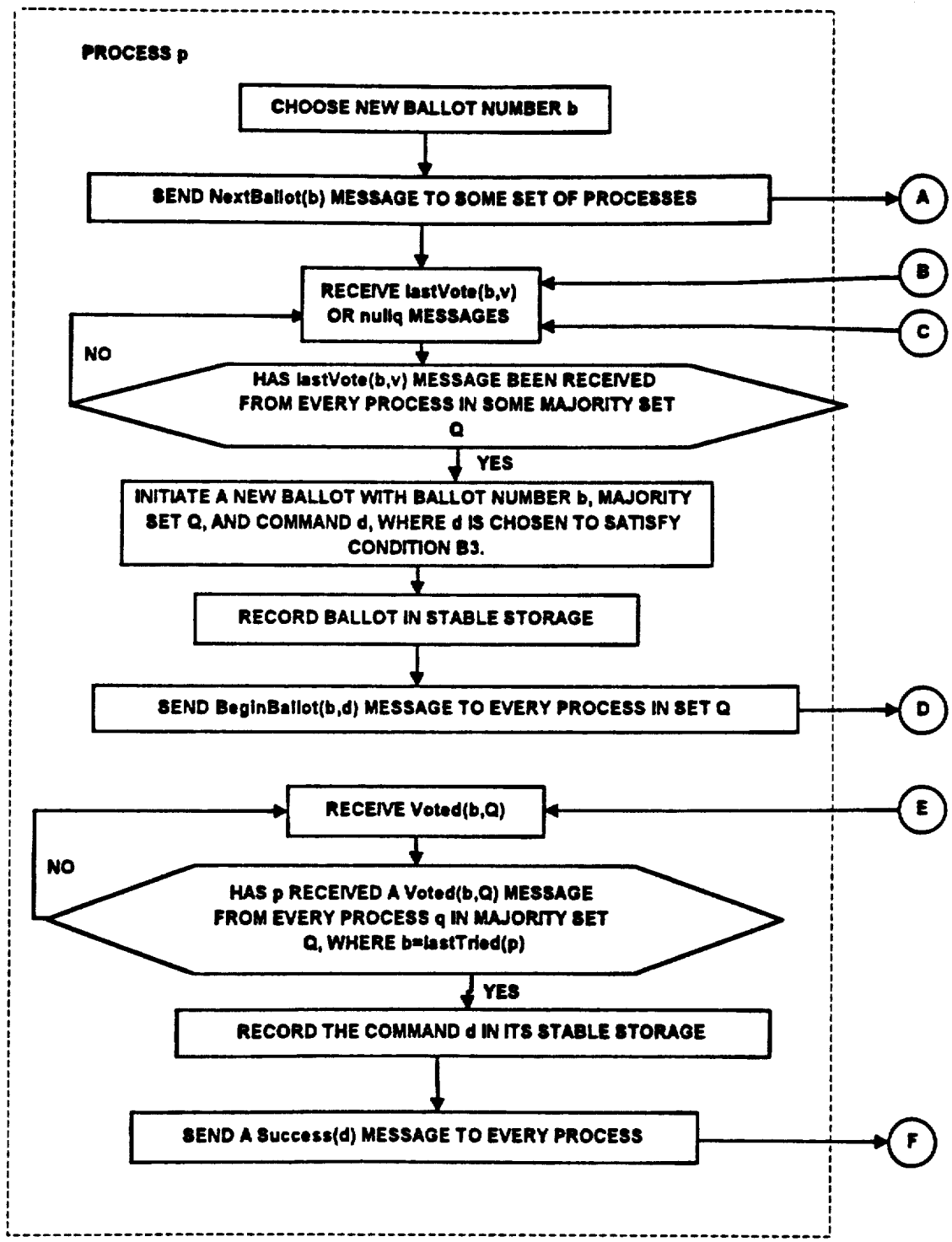
Figure 3B:
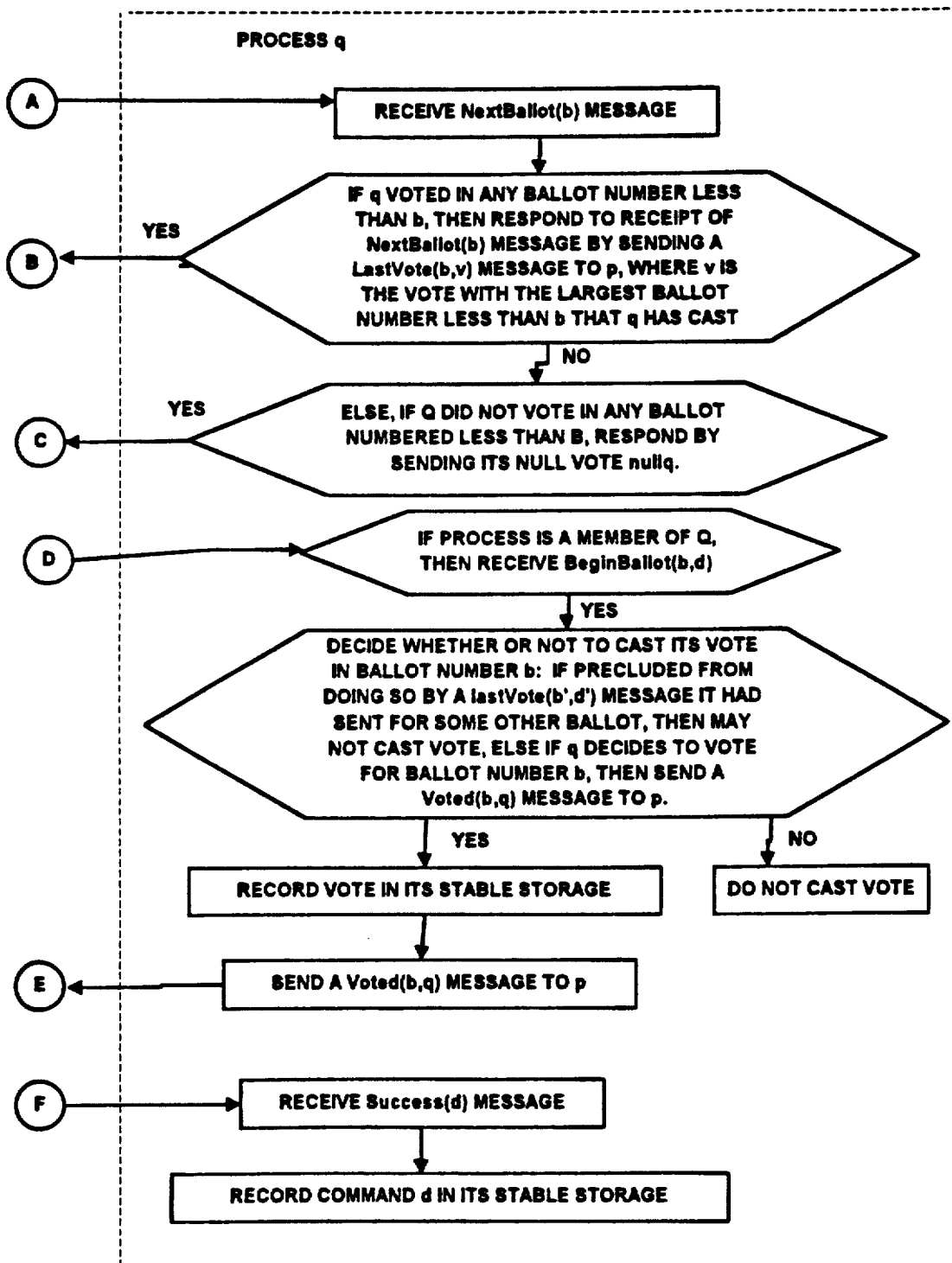

FIG. 3, comprised of FIGS. 3a and 3b, is a flow chart illustration of aspects of an embodiment of the Preliminary Protocol.

Figure 4A:
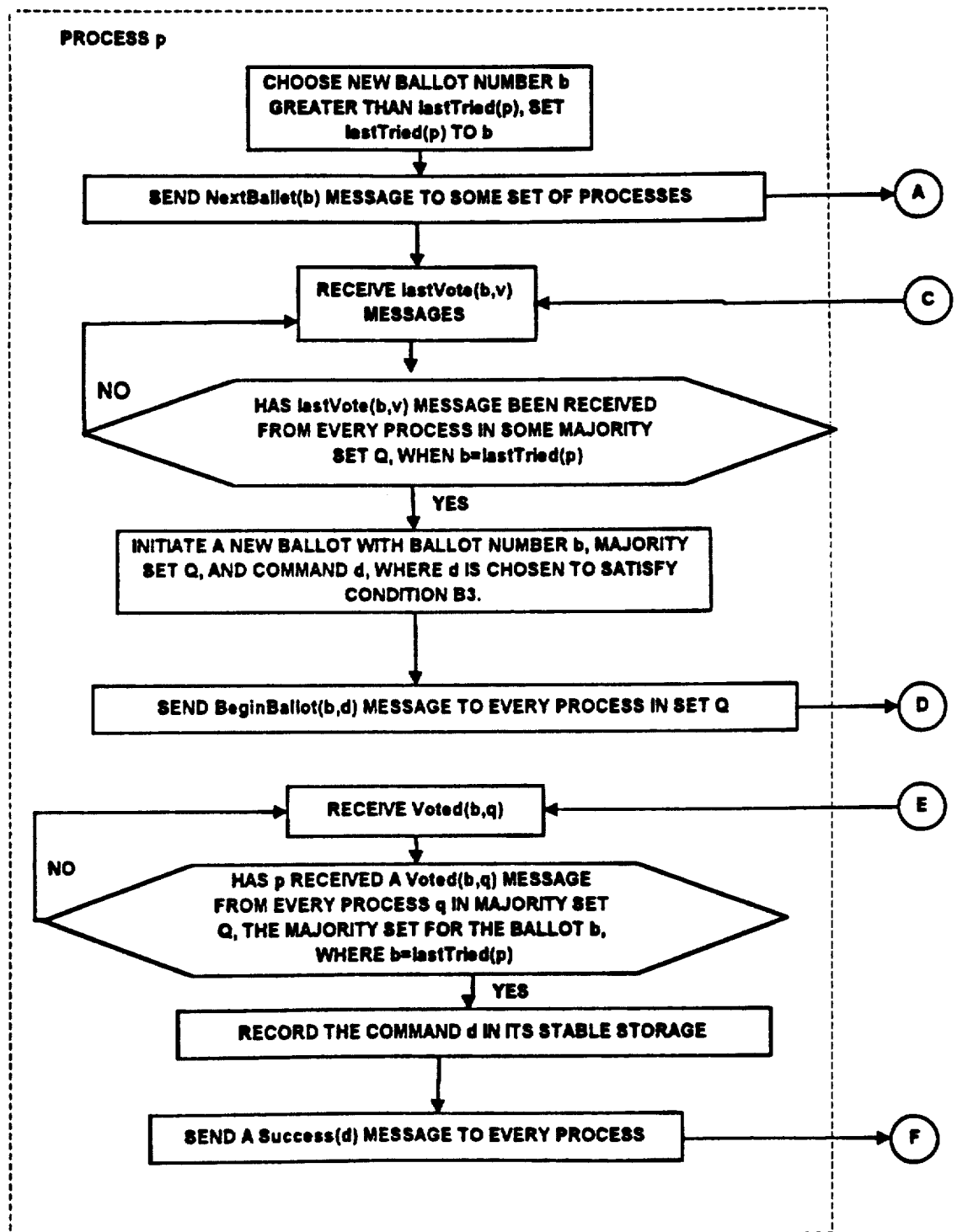
Figure 4B:
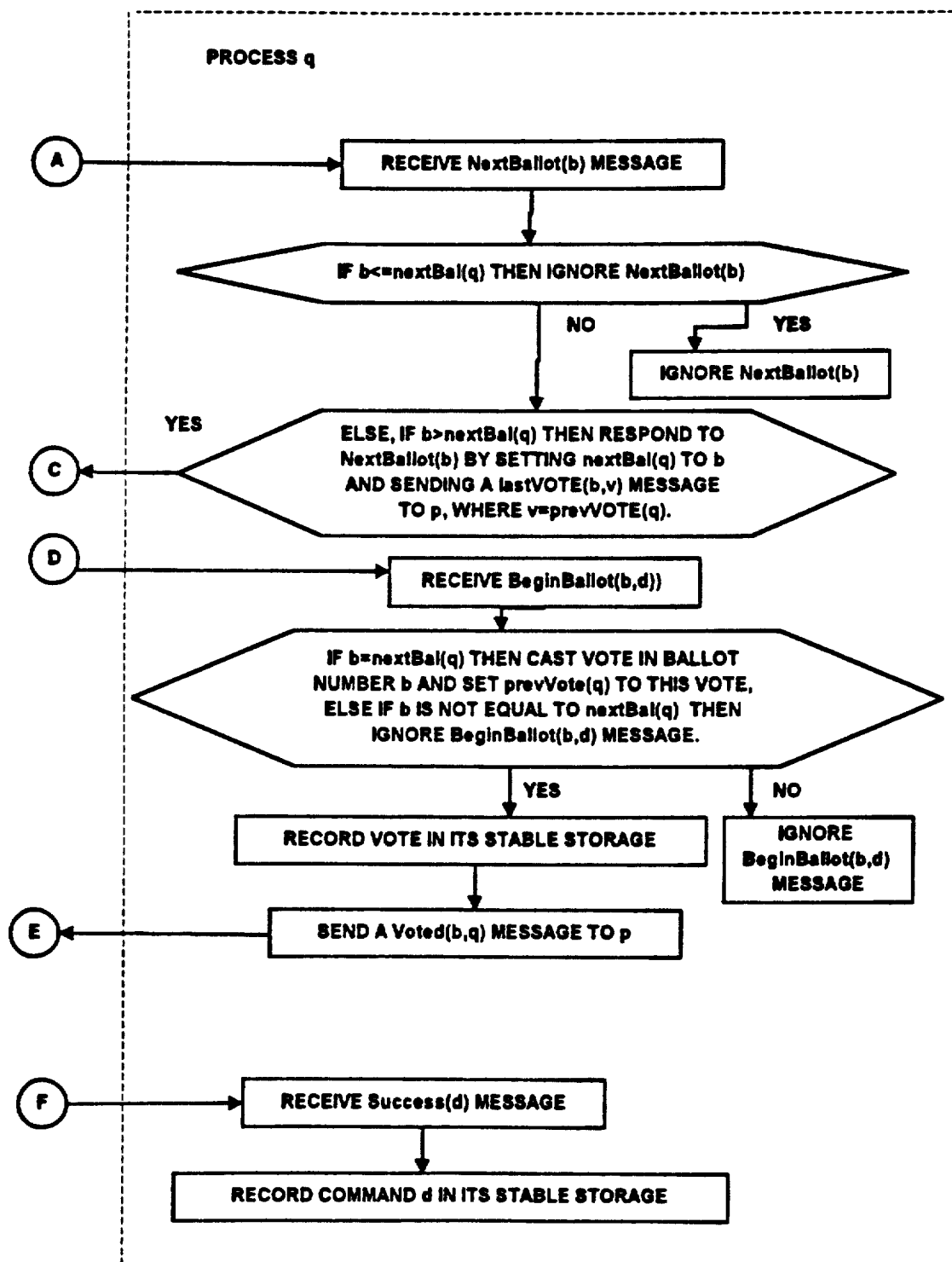

FIG. 4, comprised of FIGS. 4a and 4b, is a flow chart illustration of aspects of an embodiment of the Basic Protocol.

Figure 5A:
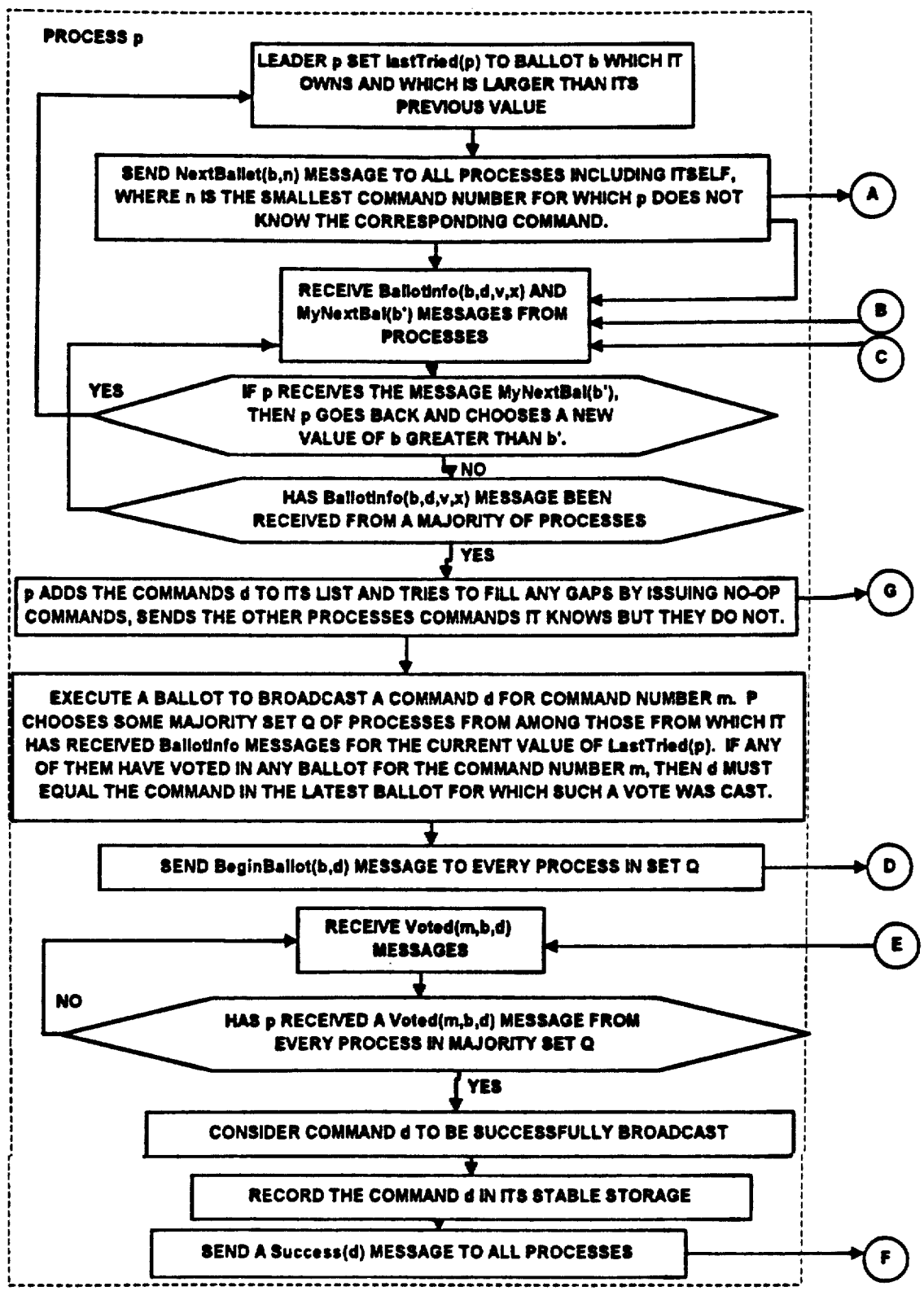
Figure 5B:
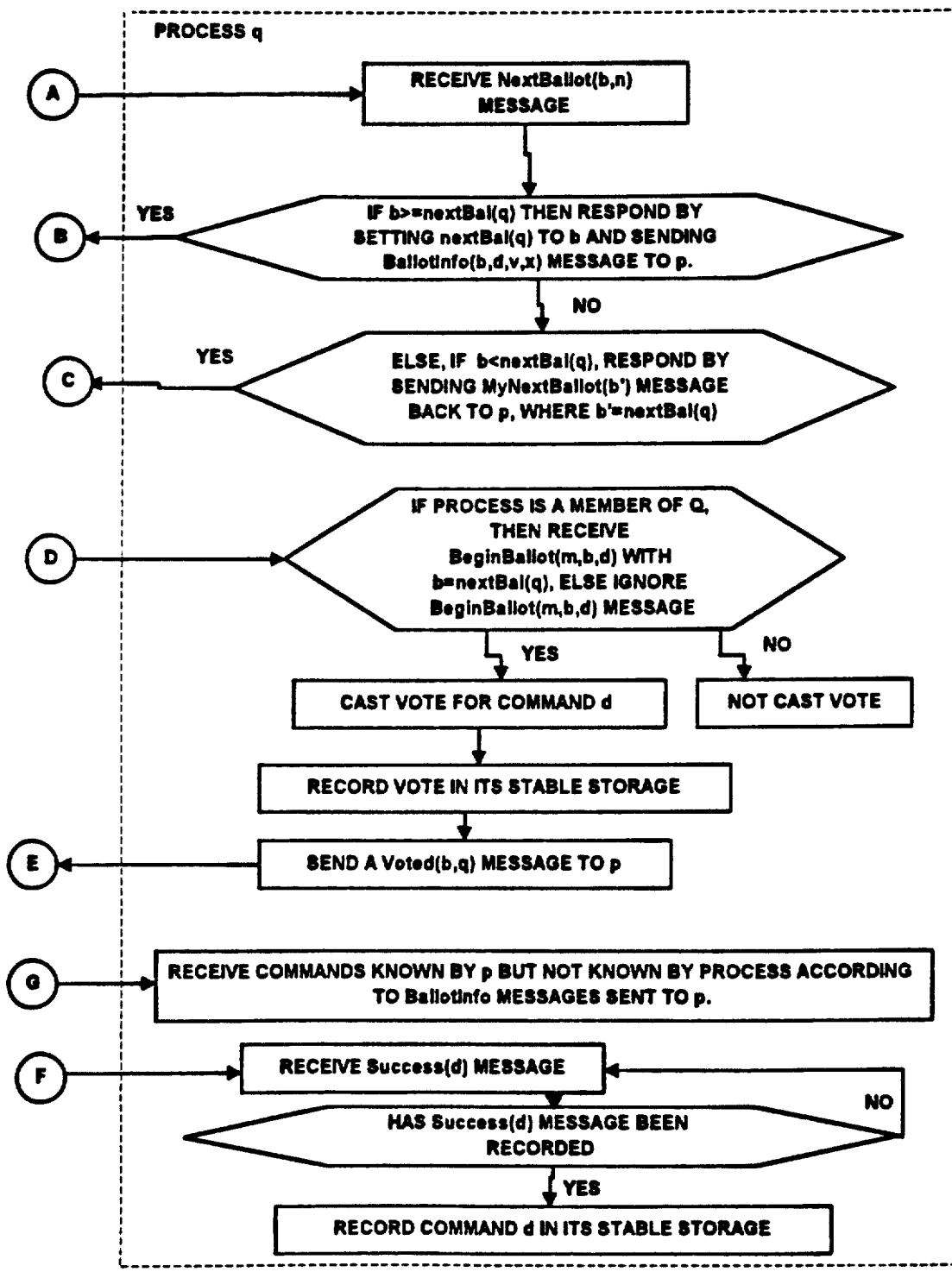

FIG. 5, comprised of FIGS. 5a and 5b, is a flow chart illustration of aspects of an embodiment of the Complete Protocol.

Figure 6A:
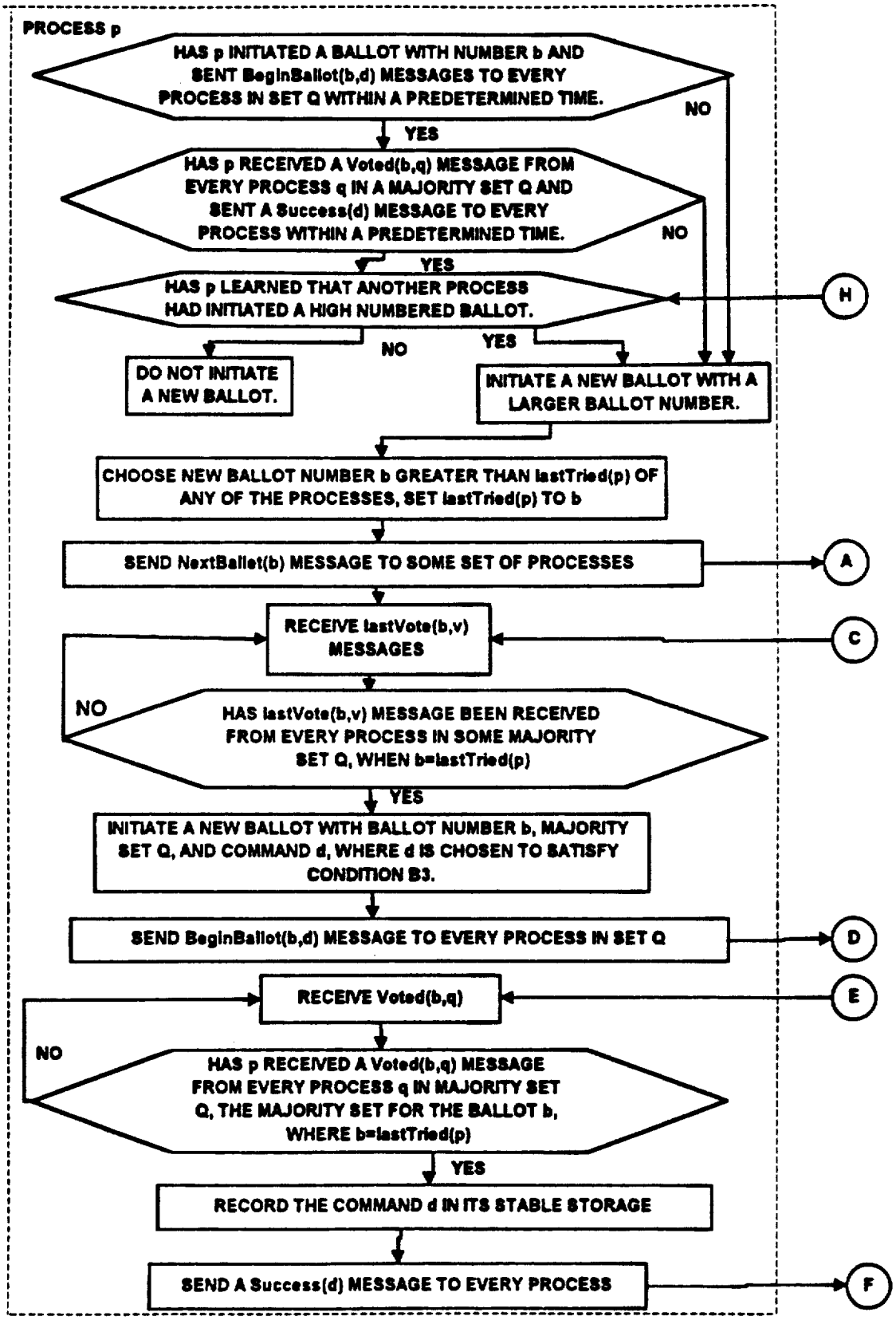
Figure 6B:
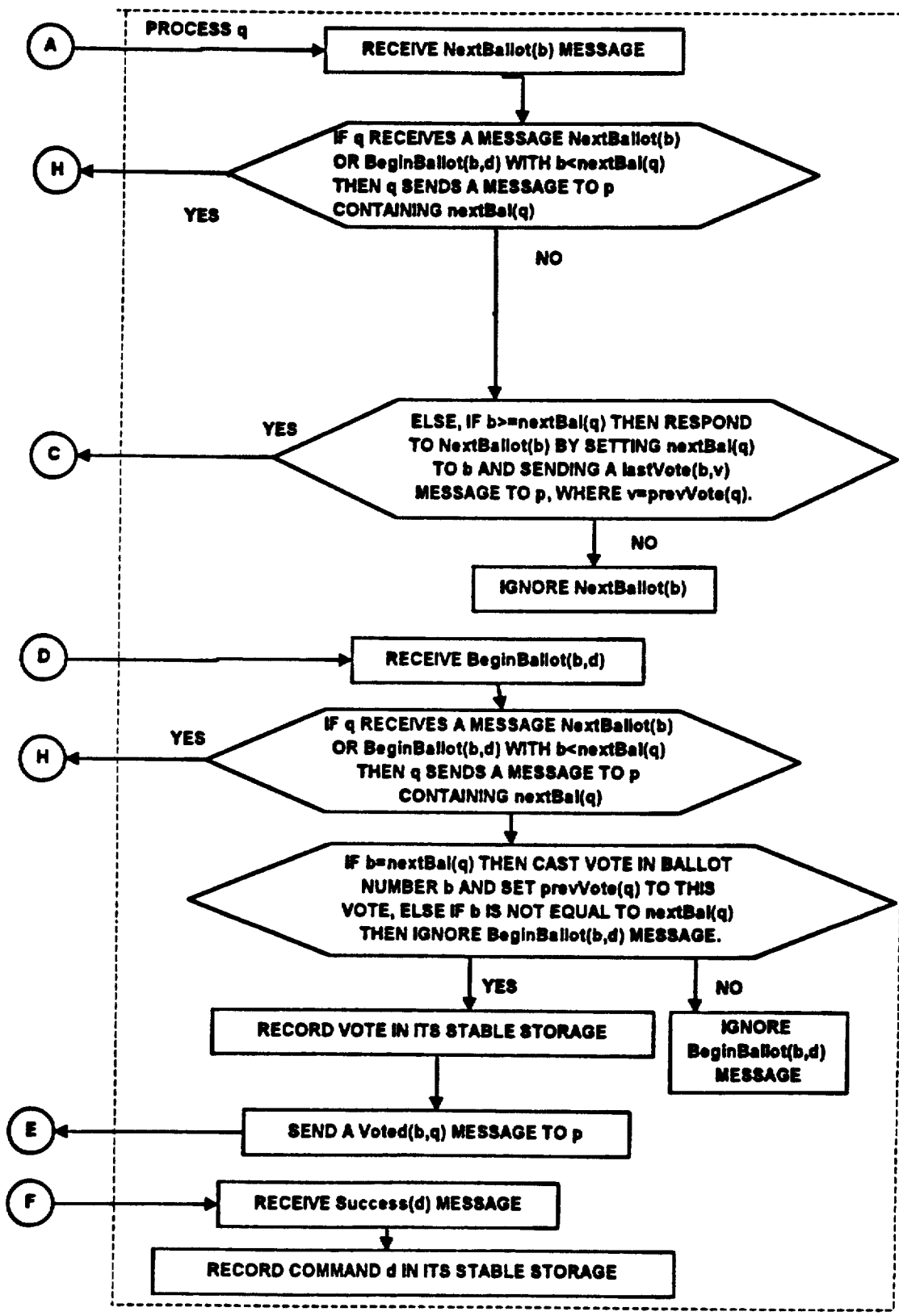

FIG. 6, comprised of FIGS. 6a and 6b, is a flow chart illustration of aspects of an embodiment of the Multiple Command Protocol.

Figure 1:
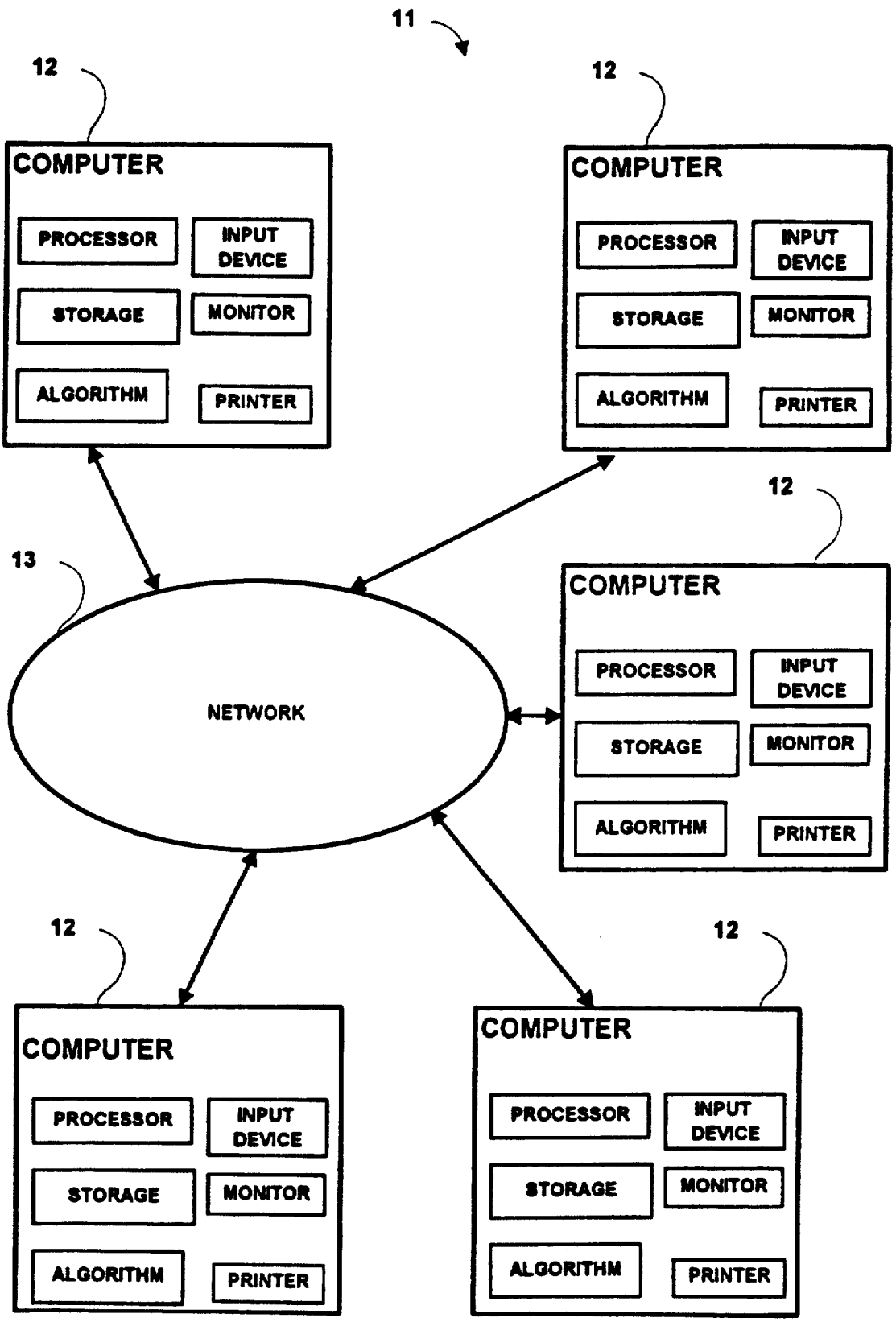
FIG. 1 is a block diagram of one embodiment of a distributed data processing system utilizing a state machine according to the invention.

As illustrated in FIG. 1, a distributed system 11 in which the invention is employed has a set of computers 12 which are connected together by a network 13. Each of the computers includes at least a processor and some means of stable storage from which information will not be lost in the event of a crash, a power failure, or the like. The computers may also include other equipment such as input devices, monitors, mass storage devices, printers, and the like. The network can be of any suitable type or configuration which permits messages to be sent between any two computers on the network.

The state machine commands are chosen through a series of numbered ballots, where each ballot is a referendum on a single command. One of the processes in the network is designated as a leader, and it sends ballots with proposed commands to the other processes. In each ballot, a process has the choice of either voting for the proposed command or hot voting. In order for a ballot to succeed and a command to be issued, a majority set of the processes in the system must vote for it. Each ballot is given a unique number, and the majority set is chosen in such manner that the majority sets voting on any two ballots will have at least one process in common.

Consistency among the processes is maintained if the following conditions are satisfied:

$B1(\beta)$: Each ballot in set $\beta$ has a unique number.

$B2(\beta)$: The majority sets for any two ballots in set $\beta$ have at least one process in common.

$B3(\beta)$: For every ballot B in a set $\beta$ of ballots, if any process in the majority set voting on ballot B voted in an earlier ballot in set $\beta$, then the command of ballot B is chosen to be the command voted upon in the latest of those earlier ballots.

Figure 2:
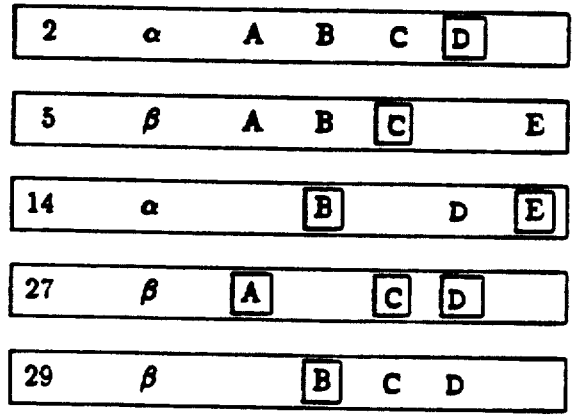
FIG. 2 is a table illustrating the implementation of one condition of the state machine.

The implementation of these conditions is illustrated by the example in the table of FIG. 2. In this example there are five ballots numbered 2, 5, 14, 27 and 29 and five processes designated A–E. The processes in the majority set for each ballot are indicated, with the processes voting for the ballot being enclosed in boxes. The processes voting for each ballot is a subset of the majority set for the ballot. Ballot number 14, for example, has a command $\alpha$, a majority set consisting of processes B, D and E, and set of voters consisting of processes B and E. Conditions $B1(\beta)$ and $B2(\beta)$ are satisfied for each of the ballots because each ballot has a unique number and the majority sets for any two of the ballots have at least-one process in common. Condition $B3(\beta)$ is applied to each of the five ballots as follows:

2. Ballot 2 is the earliest ballot, so the condition on that ballot is trivially true.

5. Since none of the processes in the majority set for ballot 5 voted in an earlier ballot, the condition on that ballot is also trivially true.

14. The only member of the majority set of ballot 14 to vote in an earlier ballot is D, and it voted in ballot 2. Therefore, the condition requires that the command for ballot 14 must equal the command of ballot 2.

27. The members of the majority set for ballot 27 are A, C and D. A did not vote in an earlier vote, the only earlier ballot in which C voted was ballot 5, and the only earlier ballot in which D voted was ballot 2. Since ballot 5 is the later of these two earlier ballots, the condition requires that the command of ballot 27 must equal the command of ballot 5.

29. The members of the majority set for ballot 29 are B, C and D. The only earlier ballot in which B voted was ballot 14, but C voted in ballots 5 and 27, and D voted in ballots 2 and 27. Since the latest of the four earlier ballots on which any of these votes occurred is ballot 27, the condition requires that the command of ballot 29 must equal the command of ballot 27.

The Preliminary Protocol

A preliminary protocol for conducting a single ballot is derived from the requirement that conditions $B1(\beta)$–$B3(\beta)$ remain true for a set $\beta$ of all ballots which have been or are being conducted. Each ballot is initiated by a process which has been designated as the leader, and that leader chooses the number, command, and majority set for the ballot. Each process in the majority set determines whether it will vote in the ballot. The rules governing how the leader chooses the ballot number, the decree and the majority set, and how the other processes decide whether on not to vote in a ballot are derived directly from the need to maintain conditions $B1(\beta)$–$B3(\beta)$.

To maintain condition B1, each ballot must receive a unique number. By recording in its store the ballots it has initiated, the leader can easily avoid initiating two different ballots with the same number. To keep different processes from initiating ballots with the same number, the set of possible ballot numbers is partitioned among the processes. This can be done, for example, by making each ballot number a pair consisting of two integers, one of which is unique to each process. The pair can be arranged as a decimal, with the integer identified with the process following the decimal point. A process can be said to own those ballot numbers which end in its own unique number.

To maintain condition B2, the majority set for a ballot is chosen to include a majority of the processes in the system. If desired, this can be a weighted majority, rather than an absolute majority, as long as any two majority sets have at least one process in common.

Condition B3 requires that if $MaxVote(b,Q,\beta)_{dec}$ is not equal to BLANK, then a ballot with number b and majority set Q must have the command $MaxVote(b,Q,\beta)_{dec}$, where $MaxVote(b,Q,\beta)_{dec}$ is the last vote cast by one of the processes in the majority set in an earlier ballot and $MaxVote(b,Q,\beta)_{dec}$ is equal to BLANK if no process in the set has voted in an earlier ballot. If $MaxVote(b,Q,\beta)_{dec}$ equals BLANK, then the ballot can have any decree. To maintain $B3(\beta)$, before initiating a new ballot with ballot number b and majority set Q, the leader must find $MaxVote(b,Q,\beta)_{dec}$, and to do so, the leader must determine $MaxVote(b,q,\beta)_{dec}$ for each process q in set Q.

$MaxVote(b,q,\beta)_{dec}$ is the vote with the largest ballot number less than b among all the votes cast by process q, or $null_q$ if process q did not vote in any ballot numbered less than b. The leader obtains $MaxVote(b,q,\beta)_{dec}$ from each process q by an exchange of messages.

The preliminary protocol for conducting a single ballot initiated by process p is follows:

1. Process p (the leader) chooses a new ballot number b and sends a NextBallot(b) message to some set of processes.

2. A process q responds to the receipt of the NextBallot(b) message by sending a LastVote(b,v) message to p, where v is the vote with the largest ballot number less than b that q has cast, or its null vote $null_q$ if q did not vote in any ballot numbered less than b.

3. After receiving a LastVote(b,v) message from every process in some majority set Q, process p initiates a new ballot with ballot number b, majority set Q, and command d, where d is chosen to satisfy condition B3. It records the ballot in stable storage and sends a BeginBallot(b,d) message to every process in set Q.

4. Upon receipt of the BeginBallot(b,d) message, process q decides whether or not to cast its vote in ballot number b. It may not cast the vote if it is precluded from doing so by a LastVote(b',d') message it had sent for some other ballot. If q decides to vote for ballot number b, then it sends a Voted(b,q) message to p and records the vote in its stable storage.

5. If p has received a Voted(b,Q) message from every process q in majority set Q, then it records the command d in its stable storage and sends a Success(d) message to every process.

6. Upon receiving a Success(d) message, a process records the command d in its stable storage. Aspects of an embodiment of the Preliminary Protocol for conducting a single ballot initiated by process p are illustrated in FIG. 3.

When process p sends its LastVote(b) message in step 2, v equals MaxVote(b,q,$\beta$), but the set $\beta$ of ballots changes as new ballots are initiated and votes are cast. Since process p is going to use v as the value of MaxVote(b,q,$\beta$) when choosing a command, to keep B3($\beta$) true, it is necessary that MaxVote(b,q,$\beta$) not change after process q has sent its LastVote(b,v) message. To keep MaxVote(b,q,$\beta$) from changing, process q must cast no new votes with ballot numbers between $v_{bal}$ and b, where $v_{bal}$ is the ballot number of vote v. Thus, having sent the LastVote(b,v) messages, process q is precluded from casting any such vote.

The execution of step 3 adds a ballot B to set $\beta$, where $B_{bal}=b$, $B_{qrm}=Q$, $B_{vot}=0$ since no one has yet voted in this ballot, and $B_{dec}=d$. In step 4, if process q decides to vote in the ballot, then executing that step changes the set $\beta$ of ballots by adding q to the set $B_{vot}$ of voters in the ballot B of the set.

In step 4, a process has the option not to vote, even if casting a vote is not precluded by a previous LastVote message. In fact, all the steps in this protocol are optional. For example, a process q in the majority set can ignore a NextBallot(b) message instead of executing step 2. Failure to take an action can prevent progress, but it cannot cause any inconsistency because it cannot make the conditions B1($\beta$)-B3($\beta$) false. Since the only effect not receiving a message can have is to prevent an action from happening, message loss also cannot cause inconsistency. Thus, the protocol guarantees consistency even if a computer fails or messages are lost.

Receiving multiple copies of a message can cause an action to be repeated. Except in step 3, performing the action a second time has no effect. For example, sending several Voted(b,q) messages in step 4 has the same effect as sending just one. The repetition of step 3 is prevented by using the entry made in stable storage when it is executed. Thus, the consistency condition is maintained even if the same message is received several times.

Steps 1-4 thus contain the protocol for initiating a ballot and voting on it. In step 5, the results of the balloting are determined, and in step 6 the command is declared to be issued.

The preliminary protocol allows any process to initiate a new ballot at any time. Each step maintains the conditions B1($\beta$)-B3($\beta$), so the entire protocol also maintains these conditions. Since a process enters a command in its permanent storage only if it is the command of a successful ballot, consistency among the processes is maintained. This protocol does not, however, address the question of progress. In other words, while the preliminary protocol guarantees that there will be no inconsistency among the different processes in the system as to the commands which are issued, it does not guarantee that any commands will ever be issued. In the preliminary protocol, each process records (i) the number of every ballot it initiates, (ii) every vote it casts, and (iii) every Last Vote message it sends.

The Basic Protocol

The basic protocol is a refinement of the preliminary protocol. In the basic protocol the leader p conducts only one ballot at a time, whereas the preliminary protocol allows p to conduct any number of ballots concurrently. Thus, in the basic protocol, after p initiates a new ballot, it ignores any messages that pertain to any other ballot it had previously initiated. The following information is recorded in stable storage by each process q in the basic protocol:

lastTried(p): The number of the last ballot that p tried to begin, or $-\infty$ if there was none.

prevVote(q): The vote cast by q in the highest-numbered ballot in which it voted, or $-\infty$ if it never voted.

nextBal (q): The largest value of b for which q has sent a LastVote(b,v) message, or $-\infty$ if it has never sent such a message.

The leader p keeps all of the information about the progress of ballot lasttried(p) in volatile memory, and it stops conducting the ballot if that information is lost.

In the preliminary protocol, each LastVote(b,v) message sent by a process q represents a promise not to vote in any ballot numbered between $v_{bal}$ and b. In the basic protocol, it represents the stronger promise not to cast a new vote in any ballot numbered less than b. This stronger promise might prevent the process from casting a vote in step 4 of the basic protocol that it would have been allowed to cast in the preliminary protocol. However, since the preliminary protocol always gives q the option of not casting its vote, the basic protocol does not require q to do anything not allowed by the preliminary protocol.

Steps 1-6 of the preliminary protocol become the following six steps for conducting a ballot in the basic protocol, with all information used by p to conduct the ballot, other than lastTried(p), prevVote(g) and nextBal(q) being kept in volatile storage:

1. Process p chooses a new ballot number b greater than lastTried(p), sets lasttried(p) to b, and sends a NextBallot(b) message to some set of processes.

2. Upon receipt of a NextBallot(b) message from p with b>nextBal(q), process q sets nextbal(q) to b and sends a LastVote(b,v) message to p, where v equals prevVote(q). The NextBallot(b) message is ignored if b$\leq$nextBal(q).

3. After receiving a LastVote(b,v) message from every process in some majority set Q, where b=lastTried(p), process p initiates a new ballot with number b, majority set Q, and command d, where d is chosen to satisfy condition B3. Process p then sends a BeginBallot(b,d) message to every process in Q.

4. Upon receipt of a BeginBallot(b,d) message with b=nextBal(q), process q casts its vote in ballot number b, sets prevvote(q) to this vote, and sends a Voted(b,q) message to p. A BeginBallot(b,d) message is ignored if b$\neq$nextBal (q) .

5. if p has received a Voted(b,q) message from every process q in Q (the majority set for the ballot b), where b=lastTried(p), then p records d (the command of the ballot) in its stable storage and sends a Success(d) message to every process.

6. Upon receiving a Success(d) message, a process q records the command d in its stable storage. Aspects of an embodiment of the Basic Protocol for conducting a ballot are illustrated in FIG. 4.

The basic protocol is a restricted version of the preliminary protocol, meaning that every action allowed by the basic protocol is also allowed by the preliminary protocol. Since the preliminary protocol satisfies the consistency condition, the basic protocol also satisfies that condition. Like the preliminary protocol, the basic protocol does not require that any action ever be taken, so it, too, does not address the question of progress.

The Complete Protocol

As noted above, the basic protocol maintains consistency, but it does not ensure any progress because it states only what a process may do; it does not require a process to do anything. The complete protocol consists of the same six steps for conducting a ballot as the basic protocol. To help achieve progress, it includes the additional requirement that the processes perform steps 2–6 as quickly as possible. It also requires some process to perform step 1 to initiate a ballot, and this assures progress.

While never initiating a ballot will certainly prevent progress, initiating too many ballots can also prevent progress. If b is larger than any other ballot number, then the receipt of a NextBallot(b) message by a process q in step 2 may set nextbal(q) to a value that prevents q from voting in step 4 for any previously initiated ballot. Thus, the initiation of a new ballot can prevent any previously initiated ballot from succeeding. If new ballots are continually initiated with increasing ballot numbers before the previous ballots have a chance to succeed, then no progress might be made.

Achieving the progress condition requires that new ballots be initiated until one succeeds, but that they not be initiated too frequently. To develop the complete protocol, it is necessary to know how long it takes to send messages between processes and for processes to respond. By way of example, it is assumed that it takes a maximum of 4 msec to send a message between any two processes and that each process will respond within 7 msec after receiving a message. Thus, for example, if some event causes p to send a message to q and q responds with a reply to p, then p would receive that reply within 22 msec after the event. In this example, p would send its message within 7 msec of the event, q would receive the message within 4 more msec, q would respond within 7 msec, and the reply would reach p within 4 more msec.

Assume by way of further example that a single process p is initiating ballots, and that it does so by sending a message to every process in step 1 of the protocol. If p initiates a ballot when a majority set of the process is on line, then step 3 should be executed within 22 msec of the initiation of the ballot, and step 5 should be executed within another 22 msec. If p is unable to execute the steps within those times, then either some process became available after p initiated the ballot, or a ballot with a larger number was initiated by another process. To handle the latter possibility, p must learn about any ballot numbers greater than lastTried(p) used by other processes. This can be done by extending the protocol to require that if a process q receives a NextBallot(b) or a BeginBallot(b,d) message from p with b<nextBal(q), then q sends p a message containing nextBal(q). Process p then initiates a new ballot with a larger ballot number.

Still assuming that p is the only process initiating ballots, it is further assumed that p is required to initiate a new ballot if and only if (i) p had not executed step 3 or step 5 within the previous 22 msec, or (ii) it learned that another process had initiated a high-numbered ballot. If a majority set of the processes remain on line and functioning properly, then a command will be passed and recorded in the stable storage of all processes in the majority set within 99 msec. It could take 22 msec for p to start the next ballot, 22 more μsec to learn that another process had initiated a larger-numbered ballot, then 55 msec to complete steps 1–6 for a successful ballot. Thus, progress can be guaranteed if only a single process which remains on line and functioning properly is initiating ballots.

The complete protocol includes a procedure for choosing a single process, called the leader, to initiate ballots. Any suitable method can be employed for choosing the leader, and progress will be guaranteed if the following requirement is met:

If no process fails or restarts, then after some time T, exactly one process in the system considers itself to be the leader.

If this requirement is met, then the complete protocol will have the property that if a majority set of processes are active and no processes come on line or fail for time T+99 μsec, then at the end of that time, every process in the majority set will have a decree recorded in its stable storage.

One suitable method of choosing the leader is to select the process with the highest identification number. The selection requirement is then satisfied by having one of the processes send a message containing its identification number to every other process every T−11 msec, for some suitable choice of T. The process sending the message is considered to be the leader if it receives no message from a higher numbered process within time T.

Summarizing, the complete protocol is obtained from the basic protocol by requiring processes to perform steps 2–6 promptly, adding a method for choosing a leader which initiates ballots, and requiring he leader to initiate ballots at appropriate times. Aspects of an embodiment of the Complete Protocol are illustrated in FIG. 5. In the example given above, the leader is required to keep initiating ballots even after a command has been issued, and this ensures that processes which subsequently come onto the system will learn about the issued command. If desired, each process can send its value of lastTried(q) to the other processes in the course of selecting a leader, thereby helping the leader to choose a large enough ballot number on the first try.

The Multiple Command Protocol

The multiple command protocol differs form the protocols described above in that it allows an unlimited number of commands to be issued, rather than just a single command. Logically, the multiple command protocol uses a separate instance of the complete protocol for each command number. However, as will be apparent from the discussion hereinafter, if a single leader is selected for all these instances, it is necessary to perform the first two steps of the protocol just once. When a new leader is chosen, the following steps occur in the multiple command protocol:

1. The new leader p sets lastTried(p) to a ballot number b which it owns and which is larger than its previous value and sends a NextBallot(b,n) message to all processes including itself, where n is the smallest command number for which p does not know the corresponding command.

2. Upon receipt of a NextBallot(b,n) message from p with $b \geq nextBal(q)$, process q sets nextBal(q) to b and sends a BallotInfo(b,d,v,x) message to p, where d is the set of pairs (m,d(m)) with $m \geq n$ such that q knew that command number u was d(m).

v is the set of pairs (m,v(m)) such that: (i) $m \geq n$, (ii) q does not know command number m, (iii) q has voted in a ballot for command number m, and (iv) v(m) is the most recent vote cast by q in a ballot for decree number M.

x is the set of command numbers $<n$ for which q does not know the corresponding command.

If $b < nextBal(q)$, q sends the message MyNextBallot(b') back to p, where $b' = nextBal(q)$.

3. Upon receiving BallotInfo(b,d,v,,x) messages from a majority of the processes, p adds the commands d to its list of commands, and tries to fill in any gaps by issuing "no-op" commands, as described below. The leader also sends the other processes any commands it knows but they do not according to their BallotInfo messages.

The leader p executes a ballot to broadcast a command d for command number m as follows:

(1) p chooses some majority set Q of processes from among those from which it has received BallotInfo messages for the current value of lastTried(p). If any of those processes have voted in any ballot for command number M, then d must equal the command in the latest ballot for which such a vote was cast.

(2) p sends a BeginBallot(m,b,d) message, where $b = lastTried(p)$ to all processes in set Q.

If, however, p receives the message MyNextBal(b'), p goes back to step 1 and chooses a new value of b greater than b'.

4. Upon receipt of a BeginBallot(m,b,d) message with $b = nextBal(q)$, process q casts a vote for the command d, records that vote in stable storage, and sends a Voted(m,b,d) message back to p.

5. When p receives Voted(m,b,d) messages back from every process in the majority set Q, it considers command d to be successfully broadcast, it records the command in its stable storage, and it sends a Success(d) message to all processes.

6. Upon receiving a Success(d) message, a process q records the command d in its stable storage. Aspects of an embodiment of the Multiple Command Protocol are illustrated in FIG. 6.

In step 1 of this protocol, q is informing the other processes that it has all of the previously issued commands with numbers less than n, and in step 4, each of the other processes q informs p of all commands it already has with numbers equal to or greater than n, and it asks p to send it any commands which q does not have with numbers less than n.

In the event of gaps in the command numbers, the leader attempts to issue "no-op" commands to fill the gaps, rather than issuing operative commands with would be out of order with respect to when they were introduced. Such gaps might, for example, occur if the system were to shut down after one or more ballots have been initiated but before they are completed. Assume, for example, that commands 125 and 126 are proposed, that all of the processes shut down before they are issued, and that a new leader is chosen the next time the system is active. If all of the processes which voted for command 125 are absent, the new leader could issue command 126 without ever learning about command 125, thereby creating a gap in the command numbers. Upon discovery, this gap is filled by a "no-op" command.

As in the basic protocol and the complete protocol, each process q must keep lastTried(p), nextbal(q) and prevVote(q) in stable storage, together with the sequence of all commands issued so far. However, instead of keeping the sequence of all commands issued, a process can keep the current state, the command number of the last command reflected in that state, and a list of the recently issued commands. When a failed process is restarted, it can update its data by copying the state and/or list of recently issued commands from any other process.

As noted above, a significant advantage of this protocol is that the first two steps have to be performed only once when a new leader is chosen. Since the decree and quorum are not chosen until step 3, the new leader can send to some set of processes a single message that serves as the NextBallot(b) message for all instances of the protocol. Likewise, a process q can reply with a single message that serves as the LastVote message for step 2 of each instance of the protocol. This message contains only a finite amount of information since q can have voted in only a finite number of instances.

When the new leader has received a reply from every member of a majority set, it is ready to perform step 3 for every instance of the protocol. For some finite number of instances (command numbers), the choice of command in step 3 will be determined by condition B3. The leader immediately performs step 3 for each of those instances to try passing these commands. Thereafter, whenever it receives a request to issue a command, it chooses the lowest numbered command that it is still free to choose, and it performs step 3 for that command number or instance of the protocol to try to issue the decree.

As long as the leader remains the leader and no processes come on line or leave the system, when the leader receives a request to issue a command, it can assign the command a number and issue it with the following exchange of messages, where the numbers refer to the corresponding steps in the complete protocol:

3. The leader sends a BeginBallot message to each process in the majority set.

4. Each process in the majority Set sends a Voted message to the leader.

5. The leader sends a Success message to every process.

This exchange involves a total of only three message delays and about 3N messages, assuming a system of N processes and a majority set of about N/2. Moreover, the BeginBallot message for one command can be combined with the Success message for the previous one, reducing the total number of messages per command to only N/2.

The invention has a number of important features and advantages. It provides a system and method for implementing a distributed state machine in which consistency is maintained despite the failure of any number of processes and communication paths. This system and method are suitable for systems with modest reliability requirements that do not justify the expense of an extremely fault tolerant, real-time implementation. In addition, it permits commands to be issued with a minimum number of messages being exchanged between the processes in the system.

It is apparent from the foregoing that a new and improved distributed state machine and method have been provided. While only certain presently preferred embodiments have been described in detail, as will be apparent to those familiar with the art, certain changes and modifications can be made without departing from the scope of the invention as defined by the following claims.

I claim:

1. In a data processing system utilizing a distributed state machine: a network of server processes having commands in stable storage, one of said processes being designated as a leader for sending commands to the other processes, means for exchanging messages between the leader and the other processes to ensure that each of the processes has all of the commands that the other processes have, means for sending a proposed command from the leader to the other processes, means for sending messages from the other processes to the leader to indicate acceptance of the proposed command, means active upon receipt of acceptance messages from a majority of the processes in the system for sending a message to the processes in the majority to declare the command as issued, and means for recording the issued command in the stable storage of each process in the majority.

2. The system of claim 1 wherein the commands are numbered consecutively, and the means for exchanging messages includes means for sending an initial message from the leader to the other processes indicating the highest command number through which the leader has all previously issued commands, and means responsive to the initial message for sending reply messages from the other processes to the leader indicating any commands the other processes have with numbers greater than the leader's highest number, any command numbers the other processes do not have which are less than or equal to the leader's highest number, and any commands for which the other processes have previously voted but do not have command numbers.

3. The system of claim 1 including means for determining the order in which the commands are proposed, means for numbering the commands consecutively in their order of issuance, and means for conditioning the processes to give no effect to a higher numbered command proposed prior to a lower numbered command.

4. The system of claim 1 including means for preventing the leader from sending a proposed command until all previously proposed commands up to a predetermined number prior to the proposed command have been issued.

5. In a data processing system utilizing a distributed state machine: a network of server processes having consecutively numbered commands in stable storage, one of said processes being designated as a leader for sending proposed commands to the other processes in consecutively numbered ballots, means for sending an initial message from the leader to the other processes indicating the highest command number through which the leader has all previously issued commands, means responsive to the initial message for sending reply messages from the other processes to the leader indicating (i) any commands the other processes have with numbers greater than the leader's highest number, (ii) any command numbers the other processes do not have which are less than or equal to the leader's highest number, and (iii) any commands for which the other processes have previously voted but do not have command numbers, means responsive to the receipt of reply messages from a majority of the processes in the system for conditioning the leader (i) to record in its stable storage any commands indicated by the other processes with numbers greater than the leader's highest number, (ii) to send the other processes any commands they have indicated they do not have, and (iii) to send a numbered ballot containing a proposed command which is either (a) the command for which one of the processes has most recently voted but does not have a command number or (b) a new command in the event that none of the processes has indicated a voted command without a number, means for conditioning the processes which receive the ballot to send a message to the leader if they vote to accept the command and to record their votes in stable storage, means active upon receipt of voting messages from a majority of the processes in the system for sending a message declaring the command as being issued, and means for recording the issued command in the stable storage of the processes in the majority which voted for it.

6. The system of claim 5 including means for determining the order in which the commands are proposed, and means for conditioning the processes to give no effect to a higher numbered command proposed prior to a lower numbered command.

7. The system of claim 5 including means for preventing the leader from sending a ballot containing a newly proposed command until all previously proposed commands up to a predetermined number prior to the newly proposed command have been issued.

8. In a data processing system utilizing a distributed state machine: a network of server processes having commands in stable storage, one of said processes being designated as a leader for sending proposed commands to the other processes in ballots with unique numbers, means for defining a majority set of the processes such that any two majority sets selected in a similar manner will have at least one process in common, means for sending a message from the leader to the other processes in the majority set to indicate that a new ballot is coming, means for sending reply messages from the other processes in the majority set to the leader identifying the most recent ballots and commands for which they have voted, means responsive to the reply messages for sending a ballot to the processes in the majority set on the command identified as being the one most recently voted for in a previous ballot, means for sending messages from the other processes to the leader to vote for the proposed command, and means responsive to votes from the processes in the majority set for declaring the command as issued if all of the processes in the set vote for it.

9. In a data processing system utilizing a distributed state machine: a network of server processes having consecutively numbered commands in stable storage, one of said processes being designated as a leader for sending proposed commands to the other processes in consecutively numbered ballots, means for defining a majority set of the processes such that any two majority sets selected in a similar manner will have at least one process in common, means for sending a message from the leader to the processes in the majority set indicating that a new ballot with a proposed ballot number is coming, means responsive to the new ballot message for sending reply messages from the other processes in the majority set to the leader indicating any commands for which the other processes have previously voted but do not have command numbers, means responsive to the reply messages for conditioning the leader to send a numbered ballot to the processes in the majority set containing as a proposed command the command for which one of the processes has most recently voted but does not have a command number, means for conditioning the processes which receive the ballot to send a message to the leader if they vote to accept the command and to record their votes in stable storage, means active upon receipt of voting messages from all of the processes in the majority set for sending a message declaring the command as being issued, and means for recording the issued command in the stable storage of the processes in the majority set.

10. In a method of implementing a distributed system utilizing a state machine with a network of server processes having commands in stable storage, the steps of: designating one of the processes being as a leader for sending commands to the other processes, exchanging messages between the leader and the other processes to ensure that each of the processes has all of the commands that the other processes have, sending a proposed command from the leader to the other processes, sending messages from the other processes to the leader to indicate acceptance of the proposed command, upon receipt of acceptance messages from a majority of the processes in the system sending a message to the processes in the majority to declare the command as issued, and recording the issued command in the stable storage of each process in the majority.

11. The method of claim 10 wherein the commands are numbered consecutively, and the messages are exchanged by sending a message from the leader to the other processes indicating the highest command number through which the leader has all previously issued commands, and sending reply messages from the other processes to the leader indicating any commands the other processes have with numbers greater than the leader's highest number, any command numbers the other processes do not have which are less than or equal to the leader's highest number, and any commands for which the other processes have previously voted but do not have command numbers.

12. The method of claim 10 including the steps of determining the order in which the commands are proposed, numbering the commands consecutively in their order of issuance, and conditioning the processes to give no effect to a higher numbered command proposed prior to a lower numbered command.

13. The system of claim 10 including the step of preventing the leader from sending a proposed command until all previously proposed commands up to a predetermined number prior to the proposed command have been issued.

14. In a method of implementing a distributed system utilizing a state machine with a network of server processes having consecutively numbered commands in stable storage, the steps of designating one of the processes as a leader for sending proposed commands to the other processes in consecutively numbered ballots, sending a message from the leader to the other processes indicating the highest command number through which the leader has all previously issued commands, sending reply messages from the other processes to the leader indicating (i) any commands the other processes have with numbers greater than the leader's highest number, (ii) any command numbers the other processes do not have which are less than or equal to the leader's highest number, and (iii) any commands for which the other processes have previously voted but do not have command numbers, upon receipt of reply messages from a majority of the processes in the system recording in the leader's stable storage any commands indicated by the other processes with numbers greater than the leader's highest number, sending the other processes any commands they have indicated they do not have, sending a numbered ballot containing a proposed command which is either (a) the command for which one of the processes has most recently voted but does not have a command number or (b) a new command in the event that none of the processes has indicated a voted command without a number, sending a message from each of the processes which receive the ballot if that process votes to accept the command, recording each such vote in the stable storage of the process, declaring the command as being issued upon receipt of voting messages from a majority of the processes in the system, and recording the issued command in the stable storage of the processes in the majority which voted for it.

15. The method of claim 14 including the steps of determining the order in which the commands are proposed, and conditioning the processes to give no effect to a higher numbered command proposed prior to a lower numbered command.

16. The method of claim 14 including the step of preventing the leader from sending a ballot containing a newly proposed command until all previously proposed commands up to a predetermined number prior to the newly proposed command have been issued.

17. In a method of implementing a distributed system utilizing a state machine with a network of server processes having commands in stable storage, the steps of: designating one of the processes as a leader for sending proposed commands to the other processes in ballots with unique numbers, defining a majority set of the processes such that any two majority sets selected in a similar manner will have at least one process in common, sending a message from the leader to the other processes in the majority set to indicate that a new ballot is coming, sending reply messages from the other processes in the majority set to the leader identifying the most recent ballots and commands for which they have voted, upon receipt of the reply messages sending a ballot to the processes in the majority set on the command identified as being the one most recently voted for in a previous ballot, sending messages from the other processes to the leader to vote for the proposed command, and declaring the command as issued if all of the processes in the set vote for it.

18. In a method of implementing a distributed system utilizing a state machine with a network of server processes having consecutively numbered commands in stable storage, the steps of: designating one of the processes as a leader for sending proposed commands to the other processes in consecutively numbered ballots, defining a majority set of the processes such that any two majority sets selected in a similar manner will have at least one process in common, sending a message from the leader to the processes in the majority set indicating that a new ballot with a proposed ballot number is coming, sending reply messages from the other processes in the majority set to the leader in response to the new ballot message indicating any commands for which the other processes have previously voted but do not have command numbers, sending a numbered ballot to the processes in the majority set containing as a proposed command the command for which one of the processes has most recently voted but does not have a command number, sending messages from the processes which receive the ballot to the leader if they vote to accept the command, recording the votes of the processes in stable storage, sending a message declaring the command as being issued upon receipt of voting messages from all of the processes in the majority set, and recording the issued command in the stable storage of the processes in the majority set.

19. In a method of implementing a distributed system utilizing a state machine with a network of server processes having commands in stable storage, the steps of:
 a. designating one of the processes being as a leader for sending commands to the other processes,
 b. exchanging messages between the leader and the other processes to ensure that each of the processes has all of the commands that the other processes have,
 c. sending a proposed command from the leader to the other processes,
 d. sending messages from the other processes to the leader to indicate acceptance of the proposed command,
 e. upon receipt of acceptance messages from a majority of the processes in the system, sending a message to the processes in the majority to declare the command as issued,
 f. recording the issued command in the stable storage of each process in the majority.
 g. repeating steps c-f for additional commands with the same leader and the same majority of processes participating in each repetition.

* * * * *